US005240088A

United States Patent [19]

Okui et al.

[11] Patent Number: 5,240,088

[45] Date of Patent: * Aug. 31, 1993

[54] ENGINE CONSTRUCTION FOR VEHICLE

[75] Inventors: Kaoru Okui; Manabu Kobayashi, both of Iwata, Japan

[73] Assignee: Yamaha Hatsudoki Kabushiki Kaisha, Iwata, Japan

[*] Notice: The portion of the term of this patent subsequent to Apr. 10, 2007 has been disclaimed.

[21] Appl. No.: 532,200

[22] Filed: Jun. 1, 1990

Related U.S. Application Data

[63] Continuation-in-part of Ser. No. 270,357, Nov. 14, 1988, Pat. No. 5,024,287, and a continuation-in-part of Ser. No. 346,545, May 2, 1989, Pat. No. 5,050,701.

[30] Foreign Application Priority Data

Jun. 3, 1989 [JP] Japan ................................ 1-141495

[51] Int. Cl.[5] ................................ B60K 5/04

[52] U.S. Cl. ............................ 180/297; 123/195 AC; 123/196 R

[58] Field of Search .................... 180/297, 68.1, 68.2; 123/196 R, 195 AC, 195 C

[56] References Cited

U.S. PATENT DOCUMENTS

| | | | |
|---|---|---|---|
| 3,302,740 | 2/1967 | Giacosa | 180/297 |
| 3,991,735 | 11/1976 | Horstmann | 123/195 C |
| 4,129,043 | 12/1978 | Ishikawa | 74/219 |
| 4,794,885 | 1/1989 | Honda | 123/52 M |
| 4,798,254 | 1/1989 | Lings | 180/297 |
| 4,909,311 | 3/1990 | Nakamura et al. | 180/68.1 |
| 4,915,070 | 4/1990 | Okui | 180/297 |
| 5,024,287 | 6/1991 | Okui et al. | 180/297 |
| 5,050,701 | 9/1991 | Okui et al. | 180/297 |
| 5,066,266 | 11/1991 | Kobayashi | 180/297 |

FOREIGN PATENT DOCUMENTS

| | | | |
|---|---|---|---|
| 335246 | 3/1990 | European Pat. Off. | |
| 0402719 | 12/1990 | European Pat. Off. | 180/297 |
| 2222633 | 11/1973 | Fed. Rep. of Germany | 123/196 R |
| 3210926 | 10/1983 | Fed. Rep. of Germany | 180/297 |
| 2032160 | 11/1970 | France | |
| 2179604 | 3/1987 | United Kingdom | |

*Primary Examiner*—David M. Mitchell

*Attorney, Agent, or Firm*—Ernest A. Beutler

[57] ABSTRACT

A vehicle and drive unit therefor including a transversely disposed engine located in an engine compartment. The engine is of the dry sump lubrication type and has a lubricant reservoir that extends between the cylinders and an air inlet opening to the engine compartment. The cylinders are inclined to the rear from a vertical plane at an acute angle and the engine crankshaft drives an output shaft that rotates in a plane disposed at an acute angle to the vertical and forwardly of the cylinder axis and at an acute angle to the cylinder axis. The oil scavenge and pressure pumps are driven from this shaft as are the front wheel axles which lie on the opposite side of the plane containing the cylinder axis from the output shaft axis.

10 Claims, 6 Drawing Sheets

ENGINE CONSTRUCTION FOR VEHICLE

CROSS REFERENCE TO RELATED APPLICATIONS

This application is a continuation in part of our applications Ser. No. 270,357, filed Nov. 14, 1988, entitled "Engine Unit For Vehicles," now U.S. Pat. No. 5,024,287, and Ser. No. 346,545, filed May 2, 1989 entitled "Front Wheel Drive Engine", now U.S. Pat. No. 5,050,701 which applications are assigned to the Assignee hereof.

BACKGROUND OF THE INVENTION

This invention relates to an engine construction for a vehicle and more particularly to an improved, compact engine construction and lubricating arrangement therefor.

It is well known that the engine compartments of modern motor vehicles have become quite crowded with the complexity of the engine and the various components and auxiliaries driven by the engine. Also, in front engine locations, it is desirable to maintain a low hood line for streamlining and fuel economy purposes. In a popular arrangement, the engine is positioned within the engine compartment so that the axis of rotation of its output shaft extends transversely to the engine compartment. Frequently in such applications, the engine also drives wheels that have their axes of rotation extending across the engine compartment.

In order to provide a low overall height, it is desirable to employ a dry sump type lubrication system. Such systems employ a separate dry sump lubricant reservoir for containing the oil or lubricant for the engine. This permits the engine to be placed relatively low in the chassis since the crankcase of the engine need not also provide the lubricant reservoir. However, when a separate dry sump lubrication tank is employed, it has been the practice to place this tank in a concealed location within the engine compartment. This frequently necessitates the use of an oil radiator for cooling the lubricant. This further complicates the system.

It is, therefore, a principal object of this invention to provide an improved engine unit for a vehicle embodying a dry sump lubrication system wherein the dry sump lubricant reservoir is positioned so that it will be air cooled.

It is a further object of this invention to provide an improved arrangement for locating and positioning the dry sump lubrication reservoir for an engine so that it will be adequately cooled by the air flowing through the engine compartment.

In the prior art constructions and also the constructions shown in our aforenoted copending applications, the engine has its cylinders inclined to the vertical and the engine crankshaft drives an output shaft which in turn drives the axles of the vehicle through a transmission. In the construction as described therein, the output shaft rotates about an axis that lies on one side of a plane containing the cylinder bore axes and the axle axes lie on the other side of this plane. However, the angle between the cylinder axes and the axes of the crankshaft and output shaft is such that the output shaft is disposed forwardly of the engine to a rather substantial degree. This tends to make the engine drive assembly less compact than desirable and also tends to cause the lubricant sump, if a dry sump system is employed, to be positioned so far forwardly that it cannot have adequate height without interfering with the hood line.

It is, therefore, a still further object of this invention to provide a more compact engine transmission assembly for a vehicle.

It is a further object of this invention to provide an engine transmission assembly for a vehicle.

It is a further object of this invention to provide an engine transmission assembly for a vehicle wherein the arrangement is quite compact and the axis of the transmission shafts and driven axle shafts can be quite close to each other in a horizontal direction.

SUMMARY OF THE INVENTION

This invention is adapted to be embodied in a motor vehicle having an engine compartment with an air opening at one end thereof. An internal combustion engine having a plurality of aligned cylinders extends transversely across the engine compartment and drives an output shaft that is rotatable about an axis that extends transversely across the engine compartment. The cylinders extend upwardly from the output shaft axis and are inclined from the vertical in a direction away from the engine compartment air opening. A dry sump lubrication system is provided for the engine that includes a dry sump lubricant tank that extends in the area between the cylinders and the engine compartment air opening and which extends vertically upwardly from a point beneath the output shaft axis to a point near the upper end of the cylinders to provide a substantial area that is exposed to the air flow through the engine compartment for cooling.

Another feature of this invention is adapted to be embodied in a motor vehicle having an engine compartment with a pair of driven axle shafts rotatable about a first axis that is disposed transversely in the engine compartment. An internal combustion engine has a plurality of aligned cylinders that extend transversely across the engine compartment and which drives a crankshaft that is rotatable about a second axis that also extends transversely across the engine compartment and parallel to the first axis. The cylinders extend upwardly from the crankshaft axis and are inclined from the vertical. An output shaft is rotatable about a third axis parallel to the first and second axes and is driven by the crankshaft. The second and third axes lie in a plane that is inclined to the vertical and which is disposed at an acute angle to the plane containing the bores of the cylinders.

DETAILED DESCRIPTION OF THE PREFERRED EMBODIMENT OF THE INVENTION

Figure 1:
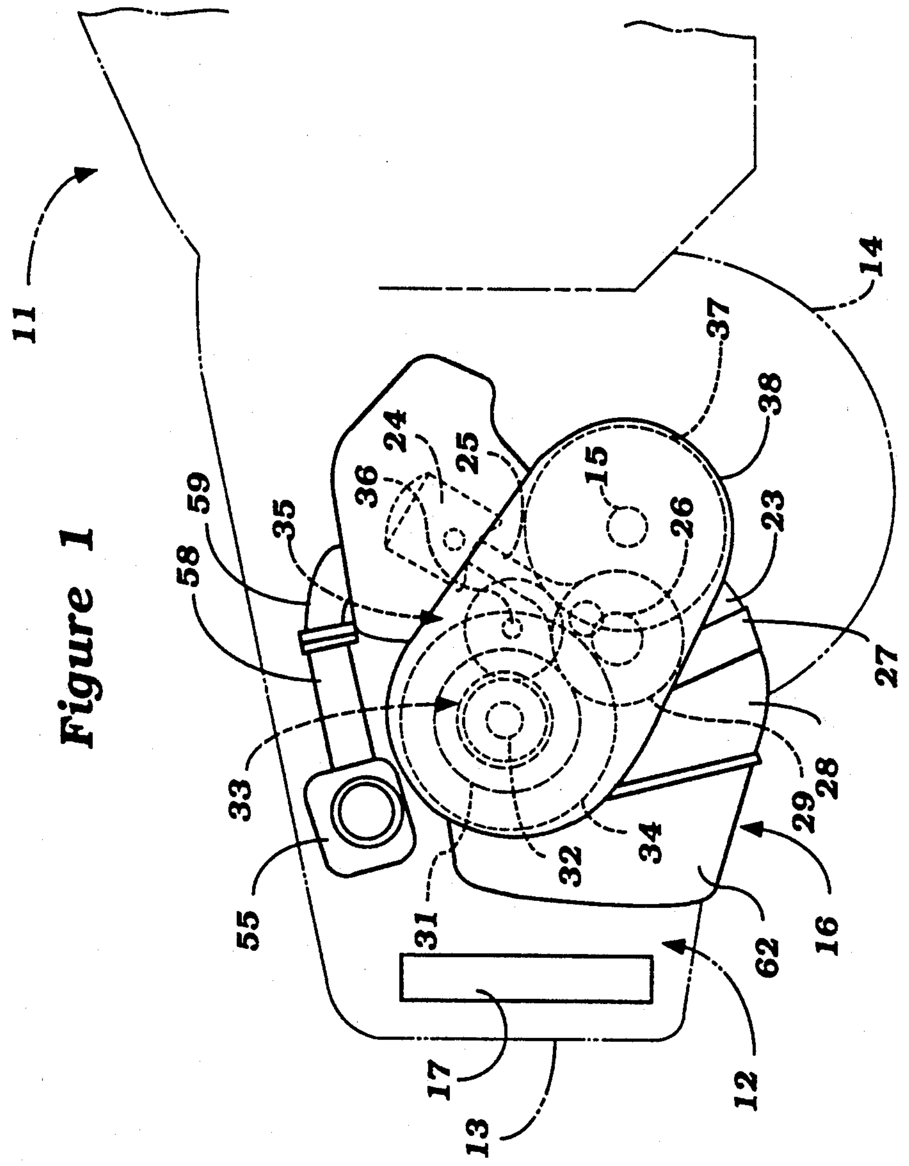
FIG. 1 is a side elevational view of a portion of a motor vehicle embodying an engine construction in accordance with an embodiment of the invention, with portions of the vehicle shown in phantom.
Figure 2:
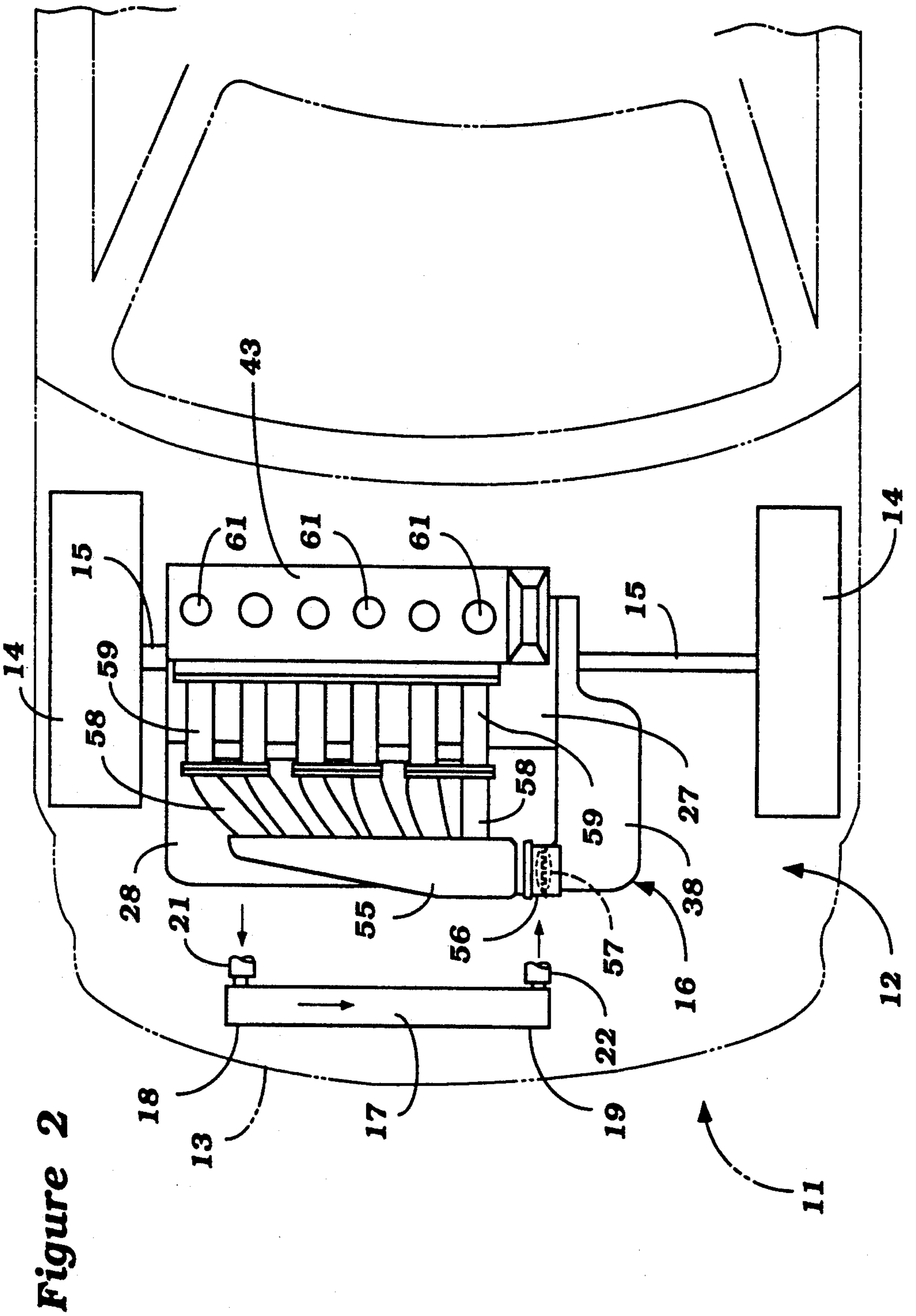
FIG. 2 is a top plan view of the portion of the vehicle shown in FIG. 1 with portions of the vehicle shown in phantom.
Figure 3:
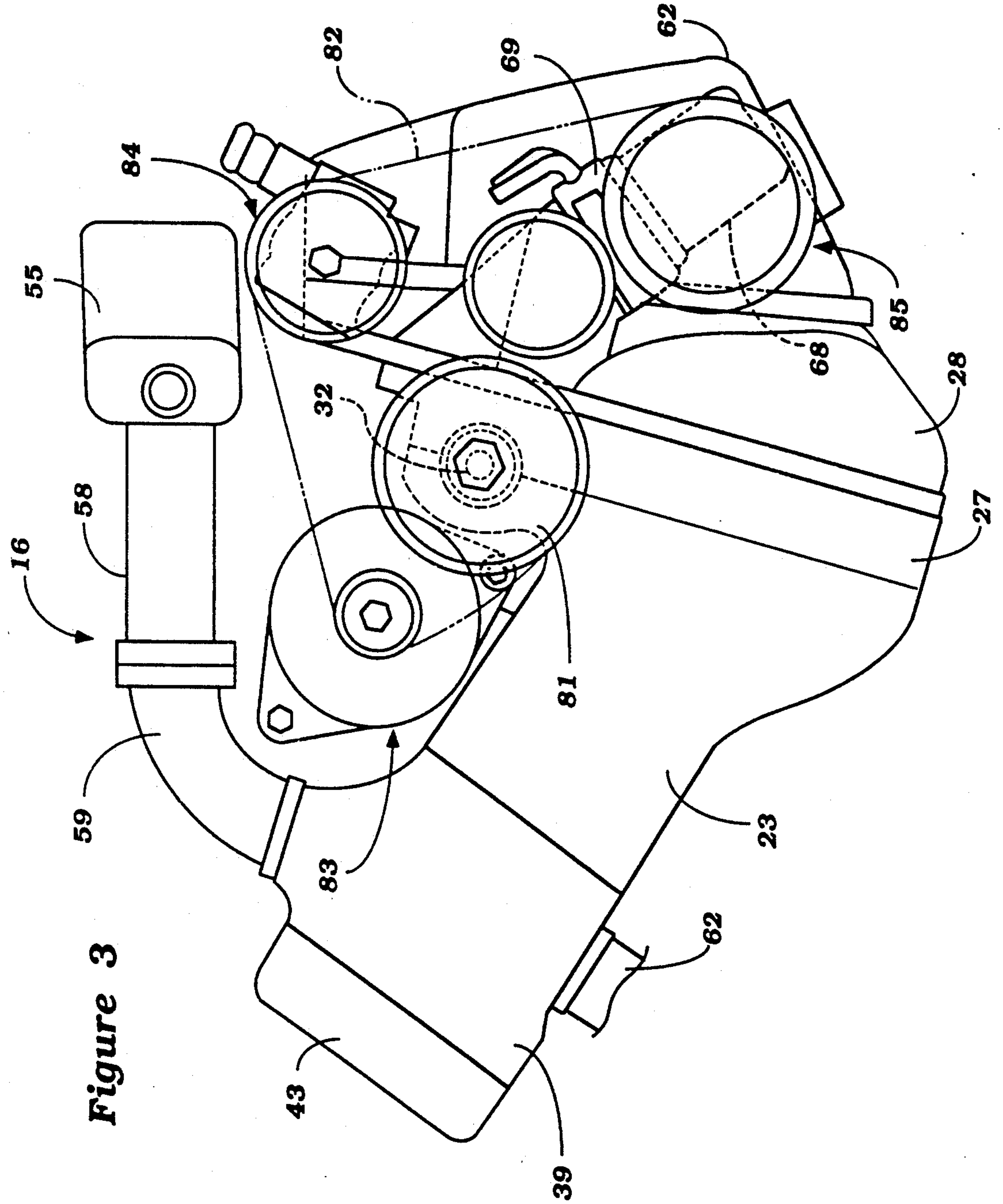
FIG. 3 is an enlarged side elevational view of the engine unit looking in the direction opposite to that shown in FIG.

Referring first in detail to FIGS. 1 and 2, a motor vehicle powered by an engine construction in accordance with an embodiment of the invention is shown primarily in phantom and is identified generally by the reference numeral 11. Only the portion of the motor vehicle 11 associated with the engine compartment has been illustrated because the invention deals with the engine construction and its placement in this engine compartment.

In the illustrated embodiment, the vehicle 11 is of the front engine transversely disposed front wheel type and has an engine compartment 12 that extends transversely across the front of the motor vehicle 11 and which is positioned rearwardly of an air inlet opening 13 which is formed in the body of the vehicle forwardly of the engine compartment 12. A pair front wheels 14 are suspended by the chassis of the vehicle 11 in a known manner and have associated with them axle shafts 15 which are driven in a manner to be described.

A power unit, indicated generally by the reference numeral 16 and which is comprised of an internal combustion engine, a change speed transmission, and a final drive, is positioned transversely in the engine compartment 12 for driving the axle shafts 15. Basically, the power unit 16 has a construction as described in our aforenoted copending application Ser. No. 270,357 and specifically the embodiment of FIGS. 6 through 8 thereof. Because, of the basic similarity of the engine of this embodiment to that of the previously described embodiment, certain components have not been illustrated fully, nor will they be described in full detail. Where that is the case, reference may be had to the aforenoted copending application, the disclosure of which is incorporated herein by reference.

A radiator 17 of the cross flow type is positioned transversely in the engine compartment 12 directly behind the air inlet opening 13. As a cross flow radiator, the radiator 17 has header tanks 18 and 19 disposed at its opposite ends which receive coolant from the power unit 16 through a hose 21 and which return coolant to the power unit 16 through a hose 22. Other components of the cooling system will be described hereinafter.

Figure 5:
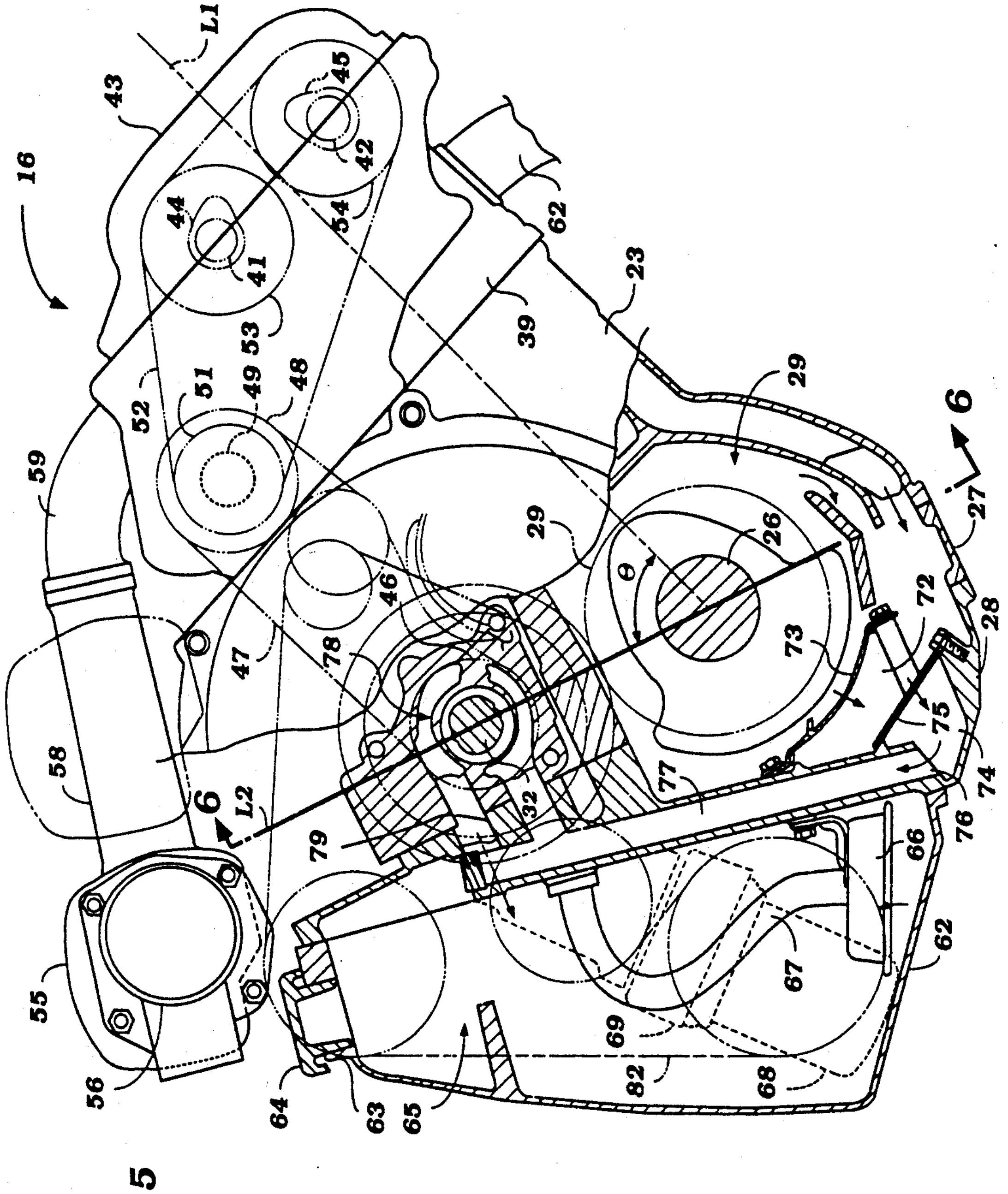
FIG. 5 is a side elevational view, in part similar to FIG. 1, on an enlarged scale and with portions broken away.

The engine portion of the power unit 16 includes a cylinder block 23 that is provided with a plurality of aligned cylinder bores in which pistons 24 reciprocate. The cylinder bores in which the pistons 24 reciprocate are inclined from the vertical rearwardly away from the engine compartment air inlet opening 13 along a line L1 as best seen in FIG. 5. In the illustrated embodiment, the engine has six cylinders although it is to be understood that the invention can be practiced with engines having other numbers of cylinders. The pistons 24 are connected by means of connecting rods 25 for driving a crankshaft 26 that is rotatable about an axis that lies on the line L1 and which is disposed at the lower ends of the cylinders. The crankshaft 26 is rotatably journaled in a known manner.

A first crankcase portion 27 is affixed to the cylinder block 23 at its lower end. However, because of the angular disposition of the cylinder block 23, the crankcase portion 27 extends generally vertically along a line that is disposed at an acute angle to the vertical but which extends forwardly of a vertically extending plane from the line L1. This plane is generally designated by the line L2. A further crankcase portion 28 is affixed to the portion 27 and also extends vertically upward and is disposed forwardly of the crankcase portion 27. The portions 27 and 28 and the cylinder block 23 define a crankcase chamber 29 in which the crankshaft 26 rotates.

Figure 6:
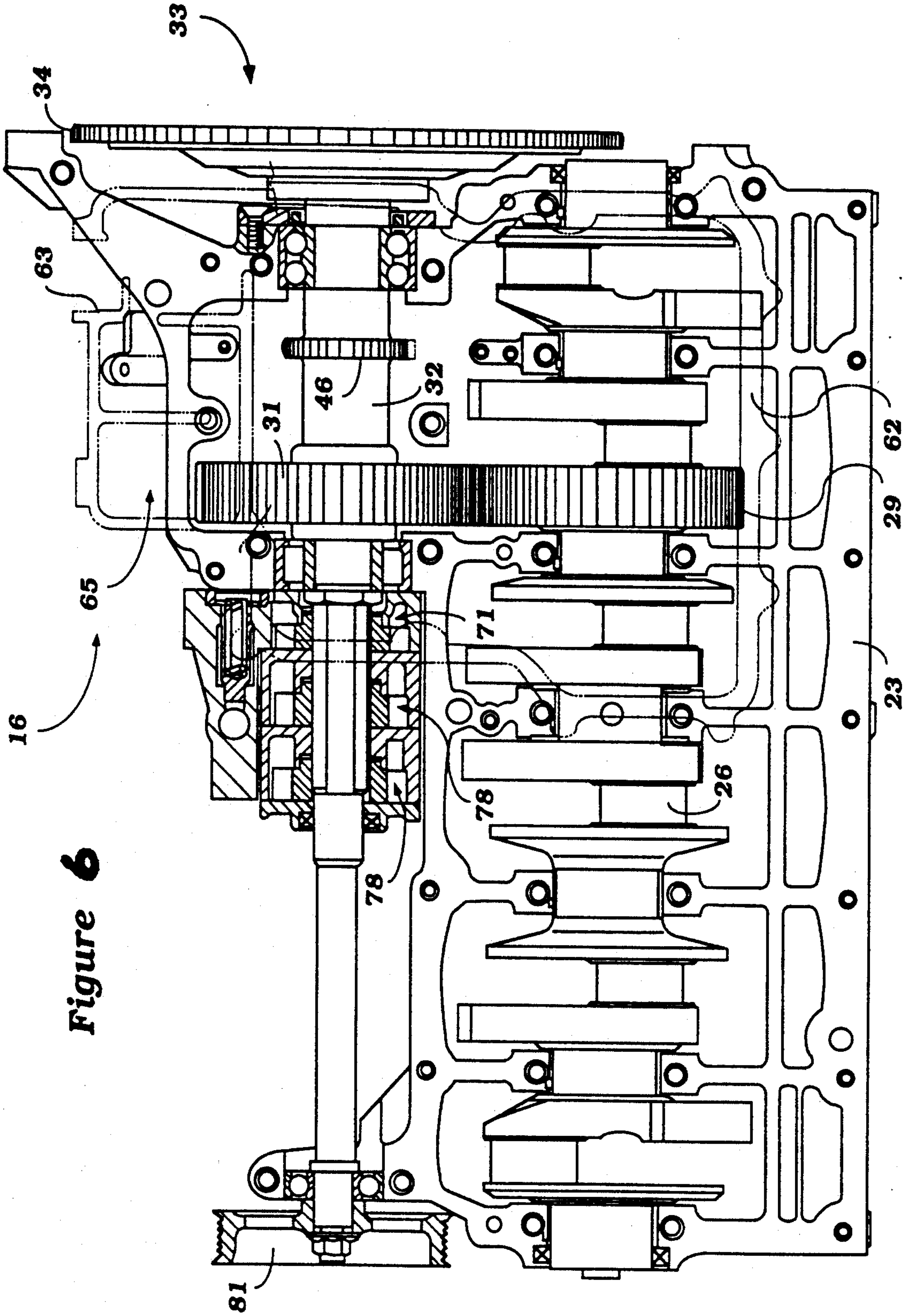
FIG. 6 is a cross sectional view taken along the line 6—6 of FIG. 5.

As may be seen in FIG. 6, one of the cheeks of the crankshaft 26 is formed with an integral gear portion 29 which is enmeshed with a gear 31 that is affixed to or associated with an output shaft 32. The output shaft 32 is supported for rotation by the cylinder block 23 and crankcase portion 27 for rotation about an axis that is disposed parallel to the axis of rotation of the crankshaft 26 and the axle shafts 15, but which lies on the line L2. The line L2 is disposed at an acute angle, as aforenoted, to a vertically extending plane and at an acute angle $\theta$ relative to the plane L1. This acute angle relationship permits a very compact engine and final drive assembly, as will become apparent.

With the prior art type of constructions and specifically that shown in our copending application Ser. No. 270,257, the output shaft axis 32 is disposed forwardly and at at least a right angle to the cylinder bore axis defined by the line L1. As a result, this axis is disposed at a relatively low height H2 from the vertical and forwardly of the crankshaft axis. However, by disposing the output shaft angle 32 at an acute angle to the plane L1, the height H1 is raised but the horizontal length of the engine is substantially reduced. As a result and as will be described, this permits a more compact assembly.

A flywheel, indicated generally by the reference numeral 33 and having a starter gear 34 is affixed for rotation with the output shaft 32. The flywheel 33 is associated with a clutch (not shown) as described in our aforenoted application Ser. No. 270,357 for driving a primary shaft of a change speed transmission, indicated generally by the reference numeral 35. The change speed transmission 35 includes a secondary shaft 36 and a plurality of intermeshing gear sets.

The gear sets are contained on the transmission primary shaft and secondary shaft 36 for driving the secondary shaft 36 from the primary shaft at selected speed ratios. The secondary shaft 36 drives an input gear 37 of a differential assembly for driving the axle shafts 15 in a well known manner.

It should be noted that the acute angle between the lines L1 and L2 and the close positioning of the transmission secondary shaft 36 to the line L1 permits a very compact final drive assembly and keeps the distance between the primary shaft of the transmission 35 and the axis of rotation of the axle shafts 15 very close to each other. The close positioning of the output shaft axis and the axles 15 also makes it possible to use smaller diameter gears for the final drive and this further adds to the compactness of the assembly. A transmission casing cover 38 encloses the portion of the transmission which has been described for driving the axle shafts 15. This cover 38 is affixed to the cylinder block 23 and crankcase portions 27 and 28 in a suitable manner.

A cylinder head 39 is affixed in a known manner to the upper end of the cylinder block 23 and closes the cylinder bores in which the pistons 24 reciprocate. Overhead mounted intake and exhaust valves, as described in our copending application Ser. No. 270,357, are mounted in the cylinder head 39 for controlling the admission of an intake charge and the exhaust of the burnt charge. These valves are operated by means of an intake camshaft 41 and an exhaust camshaft 42 that are journaled on the cylinder head assembly 39 and which are enclosed within a cam chamber closed by a cam cover 43. The camshafts 41 and 42 have respective cam lobes 44 and 45 for operating the intake and exhaust valves in the manner described in our aforenoted copending patent application.

A camshaft drive sprocket 46 (FIGS. 5 and 6) is formed integrally on the output shaft 32 and drives a first timing chain 47. The first timing chain 47, in turn, drives a sprocket 48 that is affixed to an intermediate cam drive shaft 49. The cam drive shaft 49 is journaled in an appropriate manner on the cylinder head 39 and, in turn, drives a second sprocket 51. A second chain 52 drives a pair of driven sprockets 53 and 54 that are affixed to the camshafts 41 and 42 respectively for driving these camshafts. As noted in our aforenoted copending application, the two to one speed reduction between the crankshaft 26 and camshafts 41 and 42 may be achieved in stages through the camshaft drive mechanism as aforedescribed. Because this mechanism is described in more detail in our copending application, further description of it in this application is not believed to be necessary.

Figure 4:
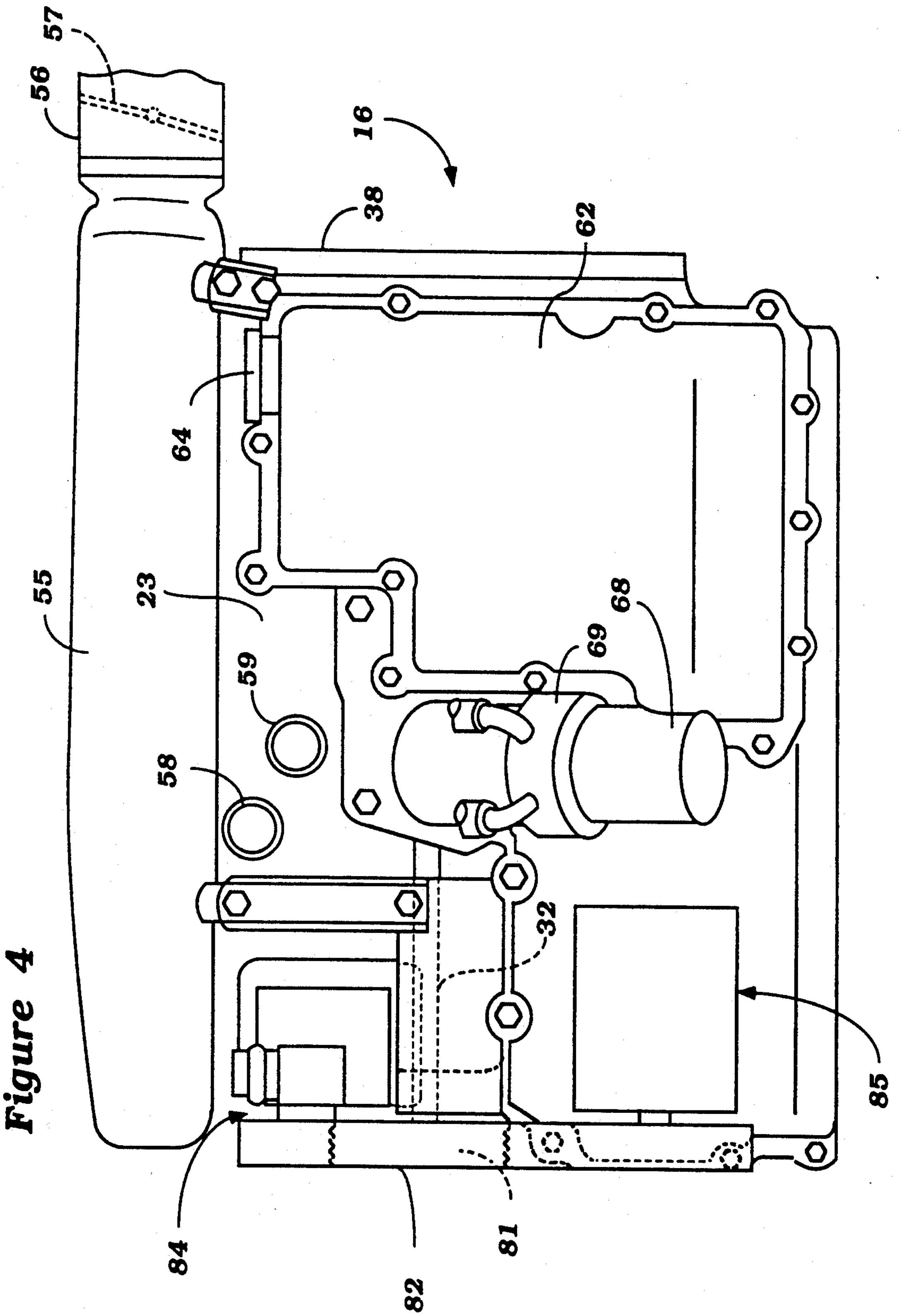
FIG. 4 is an enlarged front elevational view of the engine.

The intake valves, as aforedescribed, are associated with an air induction system that includes a plenum chamber 55 that extends transversely across the engine compartment 12 forwardly of the cylinder head and cylinder block 23. An alternative location for the plenum chamber 55 is shown at 55' in FIG. 5. This alternative location is disposed directly above the engine output shaft 32 rather than forwardly of it in the preferred position as illustrated. The plenum chamber 55 is provided with an air inlet portion 56 in which a throttle valve 57 (FIGS. 2 and 4) is positioned for controlling the engine speed. Air is delivered to the inlet section 56 from a remotely positioned air cleaner and silencer assembly (not shown).

The plenum chamber 55 has either affixed to it or formed integrally with it a plurality of runners 58 that cooperate with manifold pipes 59 which serve the individual cylinders of the engine and specifically the intake ports of the cylinder head 39 in a known manner.

Spark plugs (not shown) are contained within spark plug pockets 61 formed in the cam cover 43 and are in turn threaded into the cylinder head 39 for firing the charge admitted to the combustion chambers of the engine. The ignition system for firing these spark plugs may be of any known type. The burnt exhaust gases are then discharged through the exhaust ports of the cylinder head 39 to an exhaust manifold, shown partially and indicated by the reference numeral 62.

The engine is provided with a dry sump lubrication system that includes a dry sump lubricant reservoir 62 that is supported from the crankcase member 28 and which extends forwardly of the engine and vertically upwardly in the area to the rear of the air inlet opening 13 to the engine compartment 12. The top of the reservoir 62 has a filler neck 63 to which a detachable cap 64 is attached. The tank 62 has a large internal volume 65 and the filler neck 63 and a portion of the volume 65 extends upwardly beyond the axis of rotation of the engine output shaft 32. As a result, the tank 62 has a large surface area that will be exposed to the cooling air flow. This will insure that the lubricant is well cooled. The greater height and larger volume for the dry sump lubricant reservoir 62 is made possible because of the acute angle relationship between the planes L1 and L2 which has been previously discussed. This permits the tank 62 to be positioned rearwardly in the engine compartment and can have a significant height without adversely effecting the hood line of the vehicle.

A lubricant pressure pump 71 (FIG. 6) of the tricodal type is driven by the shaft 32 and draws oil from the lower portion of the tank 62 through a strainer inlet 66. A conduit 67 extends from the strainer inlet 66 to the inlet side of the pressure pump 71. Lubricant is then delivered from the pressure pump 71 to an oil filter 68 that is mounted on the front of the crankcase casing 28 with an oil cooler 69 being interposed between it and the crankcase member 28. The oil cooler 69 receives coolant from the cooling system including the radiator 17. The lubricant is then delivered to the various components of the engine for their lubrication in a suitable manner.

The lubricant will then return to the crankcase chamber 29 by gravity flow and specifically to an area 72 positioned below a baffle plate 73. The baffle plate 73 is juxtaposed to the crankshaft 26 so as to control the oil flow in this area. The oil will then drain to a well 74 formed below a screen 75. This oil is then picked up by the inlet 76 of a scavenge line 77 that is formed in the crankcase portion 28 for delivery to a pair of scavenge pump assemblies 78. The scavenge pump assemblies 78 are driven from the shaft 32 and are also of the tricodal type. The scavenged oil is then returned to the dry sump tank 62 through a return conduit 79.

An accessory drive pulley 81 is affixed to the end of the output shaft 32 opposite to the flywheel 33 and drives a belt 82. The belt 82 drives a plurality of accessories such as an alternator 83, power steering pump 84 and air conditioning compressor 85.

It should be readily apparent from the foregoing description that the described construction provides an extremely compact engine assembly but nevertheless one which provides an adequate lubricant system and dry sump reservoir and one in which the dry sump reservoir is positioned so that it will receive adequate cooling air flow through the engine compartment. It is to be understood that the foregoing description is that of a preferred embodiment of the invention and that various changes and modifications may be made without departing from the spirit and scope of the invention, as defined by the appended claims.

We claim:

1. In a motor vehicle having an engine compartment with an air opening at one end thereof, an internal combustion engine having a plurality of aligned cylinders extending transversely across said engine compartment and driving a crankshaft rotatable in a crankcase about an axis extending transversely across said engine compartment, said cylinders extending upwardly from said crankshaft axis and being inclined from the vertical in a direction away from said engine compartment air opening, a dry sump lubrication system for said engine including a dry sump lubricant tank extending in the area between said cylinder and said engine compartment air opening and extending vertically upwardly from a point beneath said crankshaft axis to a point near the upper end of said cylinders to provide a substantial area exposed to the air flow through said engine compartment for cooling, and a lubricant pump having a driven shaft driven by said engine crankshaft and having a driven shaft axis disposed in a plane containing the axis of rotation of said crankshaft and angularly disposed at an acute angle to the vertical on the opposite side of the vertical from the cylinder axis, the angle between the cylinder axis and said plane being at an acute angle.

2. In a motor vehicle as set forth in claim 1 wherein the lubricant pump comprises a scavenge pump for drawing lubricant from the engine crankcase and returning it to the dry sump lubricant tank and a pressure pump for delivering lubricant from the lubricant tank to the engine for its lubrication.

3. In a motor vehicle as set forth in claim 1 further including means for driving an axle of the vehicle from the engine crankshaft.

4. In a motor vehicle as set forth in claim 3 wherein the vehicle axle axis is disposed on the opposite side of the cylinder axis than the pump axis.

5. In a motor vehicle as set forth in claim 4 wherein the lubricant pump comprises a scavenge pump for drawing lubricant from the engine crankcase and returning it to the dry sump lubricant tank and a pressure pump for delivering lubricant from the lubricant tank to the engine for its lubrication.

6. In a motor vehicle as set forth in claim 5 wherein the engine is positioned in a forwardly positioned engine compartment and drives the front wheels of the vehicle.

7. In a motor vehicle having an engine compartment with an air opening at one end thereof, an internal combustion engine having a plurality of aligned cylinders extending transversely across said engine compartment and driving a crankshaft rotatable in a crankcase about an axis extending transversely across said engine compartment, said cylinders extending upwardly from said crankshaft axis and being inclined from the vertical in a direction away from said engine compartment air opening, a dry sump lubrication system for said engine including a dry sump lubricant tank extending in the area between said cylinder and said engine compartment air opening and extending vertically upwardly from a point beneath said crankshaft axis to a point near the upper end of said cylinders to provide a substantial area exposed to the air flow through said engine compartment for cooling, and a primary transmission shaft driven by said engine crankshaft and having its rotational axis lying in a plane containing the crankshaft axis and at an acute angel to the vertical plane on the opposite side from the cylinder axis and lying at an acute angle to the cylinder axis.

8. In a motor vehicle as set forth in claim 7 further including a lubricant pump driven by the engine crankshaft and having a driven shaft rotatable about an axis coincident with the primary transmission shaft axis.

9. In a motor vehicle as set forth in claim 8 wherein the lubricant pump comprises a scavenge pump for drawing lubricant from the engine crankcase and returning it to the dry sump lubricant tank and a pressure pump for delivering lubricant from the lubricant tank to the engine for its lubrication.

10. In a motor vehicle as set forth in claim 9 wherein the engine is positioned in a forwardly positioned engine compartment and drives the front wheels of the vehicle.

* * * * *